UNITED STATES PATENT OFFICE.

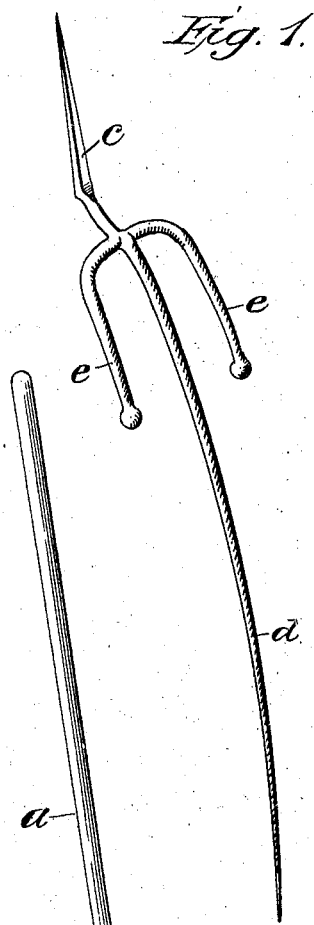
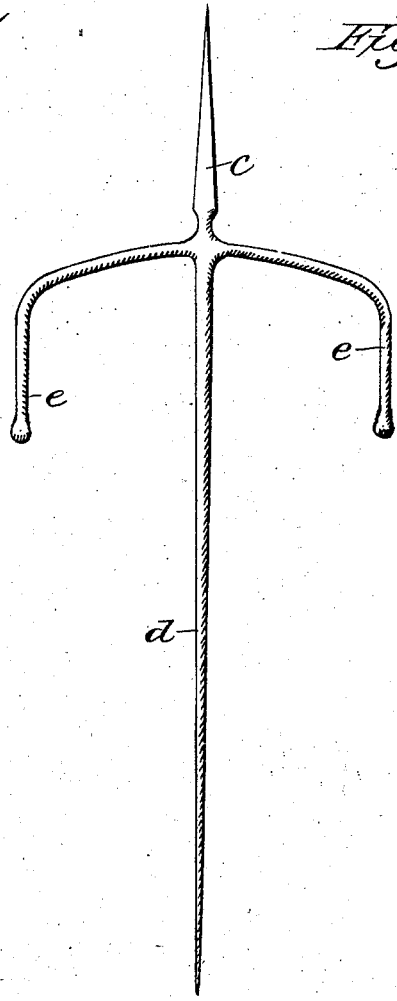
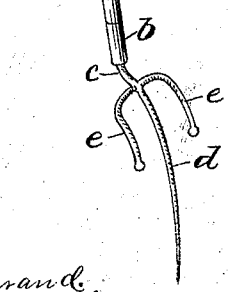

JOHN M. WOLFE, OF KELLOGG, MINNESOTA.

FODDER-FORK.

No. 806,042.  Specification of Letters Patent.  Patented Nov. 28, 1905.

Application filed September 13, 1905. Serial No. 278,250.

*To all whom it may concern:*

Be it known that I, JOHN M. WOLFE, a citizen of the United States, residing at Kellogg, in the county of Wabasha and State of Minnesota, have invented new and useful Improvements in Fodder-Forks, of which the following is a specification.

This invention has relation essentially to fodder-forks which are designed for handling sheaves or bundles of stalks, such as corn-fodder sheaves.

It is the purpose of the invention to provide a fork which from long experience has been shown to possess every requirement called for to enable fodder sheaves or bundles to be handled in the best, easiest, and most efficient manner whatever other use, if any, it may be found to subserve.

To these ends the invention consists of a fodder-fork having a long spear-like tine with a slight recurvate bend extending from the end of the handle and a lateral non-piercing bracing-prong on each side of the piercing-tine, provided on their ends with rounding or other shaped antipiercing devices. The piercing-tine is designed to easily enter the sheaf to a great extent, piercing any stalks that may be in the path of its point, while the lateral prongs are not meant to enter the bundle, but by engaging its sides to steady it to a necessary or appreciable degree on the spear-tine.

The accompanying drawings form a part of this specification and are to be referred to as such, of which—

Figure 1 is a perspective view of the invention detached from the handle. Fig. 2 is a plan view of the same and showing the lateral prongs as spread or parted to a somewhat greater extent. Fig. 3 shows the invention complete by having the handle applied thereto.

The handle $a$ may be of wood or other material of the nature of a pole and may be as long and of as great diameter as is suitable and has a ferrule $b$ secured on its forward socketed end, in which socket (not shown) the shank $c$ of the fork is driven in such way that the long spear-like tine $d$ appears as an extension thereof. The piercing-tine $d$ is, as stated, quite long relatively to the lateral prongs $e$ $e$, as is best indicated in Figs. 1 and 3. A slight recurvate bend is given to the long piercing-tine, as the said last-mentioned figures also show. The prongs $e$ $e$ are parted to the extent that may be desired (being more widely separated, if wanted, where large bundles are to be handled than where the bundles are smaller) and extend forward substantially in the same plane as the piercing-tine and are, as before stated and as is shown, much shorter than the piercing-tine. The prongs $e$ $e$ are, moreover, provided on their ends with rounded or other shaped devices that will act to retard or prevent them from piercing the sheaves or bundles. It is not necessary that the lateral prongs should be kept absolutely from entering the sheaves nor that they should be confined to any particular form or length. It is their office to steady or brace the bundle to an appreciable degree on the piercing-tine, which extends between them and much beyond their forward ends.

As has been already intimated, the invention is the outgrowth of experience, and the form and length of the piercing-tine and the relative arrangement and form of the lateral supporting or bracing prongs with respect to the said tine is shown most clearly in Figs. 1 and 3, though of course I do not limit my invention to any precise shape or length so long as the construction comes within the nature and spirit of the invention and the several parts and features are capable of performing the functions and of having the mode of operation ascribed to them.

It is not contemplated to have the laterally-arranged short non-piercing prongs exceed two in number, one on each side of the piercing-tine, nor is it designed to have less than two bracing or supporting prongs. In all cases the non-piercing prongs will be laterally arranged with respect to the long piercing-tine.

The improvements wrought by me as a whole enable the sheaf to be easily pierced to great length and depth, to be held upon the tine while being conveyed or carried from place to place, and to be handily and easily discharged from the fork.

I claim—

1. A fodder-fork having a handle, and a centrally-arranged long piercing-tine extending forward from the forward end thereof and having a recurvate bend therein, combined with relatively short laterally-arranged, non-piercing prongs, branching out from the base of the said piercing-tine.

2. A fodder-fork having a handle, and a centrally-arranged long piercing-tine extending forward from the forward end thereof and having a recurvate bend therein, combined with relatively short laterally-arranged bracing or supporting prongs, one on each side of the piercing-tine, the said laterally-arranged bracing-prongs two in number being provided on their ends with non-piercing devices.

3. A fodder-fork having a pole-handle, a centrally-arranged long, piercing-tine extending forward from the forward end thereof, combined with short laterally-arranged non-piercing devices.

In testimony whereof I affix my signature in presence of two subscribing witnesses.

JOHN M. WOLFE.

Witnesses:
H. W. CANFIELD,
J. E. PHILLIPS.